United States Patent
Bent et al.

(10) Patent No.: US 9,477,682 B1
(45) Date of Patent: Oct. 25, 2016

(54) PARALLEL COMPRESSION OF DATA CHUNKS OF A SHARED DATA OBJECT USING A LOG-STRUCTURED FILE SYSTEM

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US)

(73) Assignees: EMC Corporation, Hopkinton, MA (US); Los Alamos National Security, LLC, Los Alamos, NM (US)

( * ) Notice: Subject to any disclaimer, the term of this patent is extended or adjusted under 35 U.S.C. 154(b) by 409 days.

(21) Appl. No.: 13/799,228

(22) Filed: Mar. 13, 2013

(51) Int. Cl.
  G06F 17/30  (2006.01)
  H04L 29/06  (2006.01)
  H04L 29/08  (2006.01)
  G06F 3/06   (2006.01)

(52) U.S. Cl.
  CPC ......... *G06F 17/30224* (2013.01); *H04L 67/42* (2013.01); *G06F 3/067* (2013.01); *H04L 67/1097* (2013.01); *H04L 69/04* (2013.01)

(58) Field of Classification Search
  CPC ............... H04L 69/04; H04L 67/1097; G06F 17/30224; G06F 3/067
  See application file for complete search history.

(56) References Cited

U.S. PATENT DOCUMENTS

2009/0077252 A1* 3/2009 Abdo et al. ............... 709/231
2010/0122199 A1* 5/2010 Darrington et al. ......... 715/771
2010/0223539 A1* 9/2010 Nowoczynski et al. ................ G06F 3/067 714/807
2012/0054252 A1* 3/2012 Olderdissen et al. ........ 707/823
2012/0089781 A1* 4/2012 Ranade et al. ............... 711/118
2013/0227194 A1* 8/2013 Kannan et al. ............... 711/103
2014/0214770 A1* 7/2014 Kannan et al. ............... 707/649

OTHER PUBLICATIONS

Bent et al., "PLFS: a checkpoint filesystem for parallel applications", Nov. 20, 2009, ACM, SC09, https://institute.lanl.gov/plfs/plfs.pdf.*
Kannan et al., "Using active NVRAM for cloud I/O", Oct. 13, 2011, IEEE, http://www.cercs.gatech.edu/opencirrus/OCsummit11/papers/paper6-kannan.pdf.*
Goodell et al. "An Evolutionary Path to Object Storage Access", Date of Conference: Nov. 10-16, 2012, IEEE.*

* cited by examiner

*Primary Examiner* — Chris Parry
*Assistant Examiner* — Daeoo Lee
(74) *Attorney, Agent, or Firm* — Ryan, Mason & Lewis, LLP

(57) ABSTRACT

Techniques are provided for parallel compression of data chunks being written to a shared object. A client executing on a compute node or a burst buffer node in a parallel computing system stores a data chunk generated by the parallel computing system to a shared data object on a storage node by compressing the data chunk; and providing the data compressed data chunk to the storage node that stores the shared object. The client and storage node may employ Log-Structured File techniques. The compressed data chunk can be de-compressed by the client when the data chunk is read. A storage node stores a data chunk as part of a shared object by receiving a compressed version of the data chunk from a compute node; and storing the compressed version of the data chunk to the shared data object on the storage node.

20 Claims, 4 Drawing Sheets

US 9,477,682 B1

PARALLEL COMPRESSION OF DATA CHUNKS OF A SHARED DATA OBJECT USING A LOG-STRUCTURED FILE SYSTEM

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATION

This application is related to U.S. patent application Ser. No. 13/799,264, filed Mar. 13, 2013, entitled "Parallel Checksumming of Data Chunks of a Shared Data Object Using a Log-Structured File System," (now U.S. Pat. No. 9,436,722) incorporated by reference herein.

FIELD

The present invention relates to parallel storage in high performance computing environments.

BACKGROUND

Parallel storage systems are widely used in many computing environments. Parallel storage systems provide high degrees of concurrency in which many distributed processes within a parallel application simultaneously access a shared file namespace.

Parallel computing techniques are used in many industries and applications for implementing computationally intensive models or simulations. For example, the Department of Energy uses a large number of distributed compute nodes tightly coupled into a supercomputer to model physics experiments. In the oil and gas industry, parallel computing techniques are often used for computing geological models that help predict the location of natural resources. Generally, each parallel process generates a portion, referred to as a data chunk, of a shared data object.

Compression is a common technique to store data with fewer bits than the original representation. For example, lossless compression reduces bits by identifying and eliminating statistical redundancy. Among other benefits, compression reduces resource usage, such as data storage space or transmission capacity.

Existing approaches compress the shared data object after it has been sent to the storage system. The compression is applied to offset ranges on the shared data object in sizes that are pre-defined by the file system.

In parallel computing systems, such as High Performance Computing (HPC) applications, the inherently complex and large datasets increase the resources required for data storage and transmission. A need therefore exists for parallel techniques for compressing data chunks being written to a shared object.

SUMMARY

Embodiments of the present invention provide improved techniques for parallel compression of data chunks being written to a shared object. In one embodiment, a client executing on one or more of a compute node and a burst buffer node in a parallel computing system stores a data chunk generated by the parallel computing system to a shared data object on a storage node in the parallel computing system by compressing the data chunk; and providing the data compressed data chunk to the storage node that stores the shared object.

The client may be embodied, for example, as a Log-Structured File System client, and the storage node may be embodied, for example, as a Log-Structured File server.

According to another aspect of the invention, the compressed data chunk can be de-compressed by the client when the data chunk is read from the storage node. In this manner, the de-compressed data chunk can be provided to an application requesting the data chunk.

According to another aspect of the invention, a storage node in a parallel computing system stores a data chunk as part of a shared object by receiving a compressed version of the data chunk from a compute node in the parallel computing system; and storing the compressed version of the data chunk to the shared data object on the storage node. The storage node can provide the compressed data chunk to a compute node when the data chunk is read from the storage node.

Advantageously, illustrative embodiments of the invention provide techniques for parallel compression of data chunks being written to a shared object. These and other features and advantages of the present invention will become more readily apparent from the accompanying drawings and the following detailed description.

DETAILED DESCRIPTION

The present invention provides improved techniques for cooperative parallel writing of data to a shared object. Generally, one aspect of the present invention leverages the parallelism of concurrent writes to a shared object and the high interconnect speed of parallel supercomputer networks to compress the data in parallel as it is written. A further aspect of the invention leverages the parallel supercomputer networks to provide improved techniques for parallel decompression of the compressed data as it is read.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices. As used herein, the term "files" shall include complete files and portions of files, such as sub-files or shards.

Figure 1:
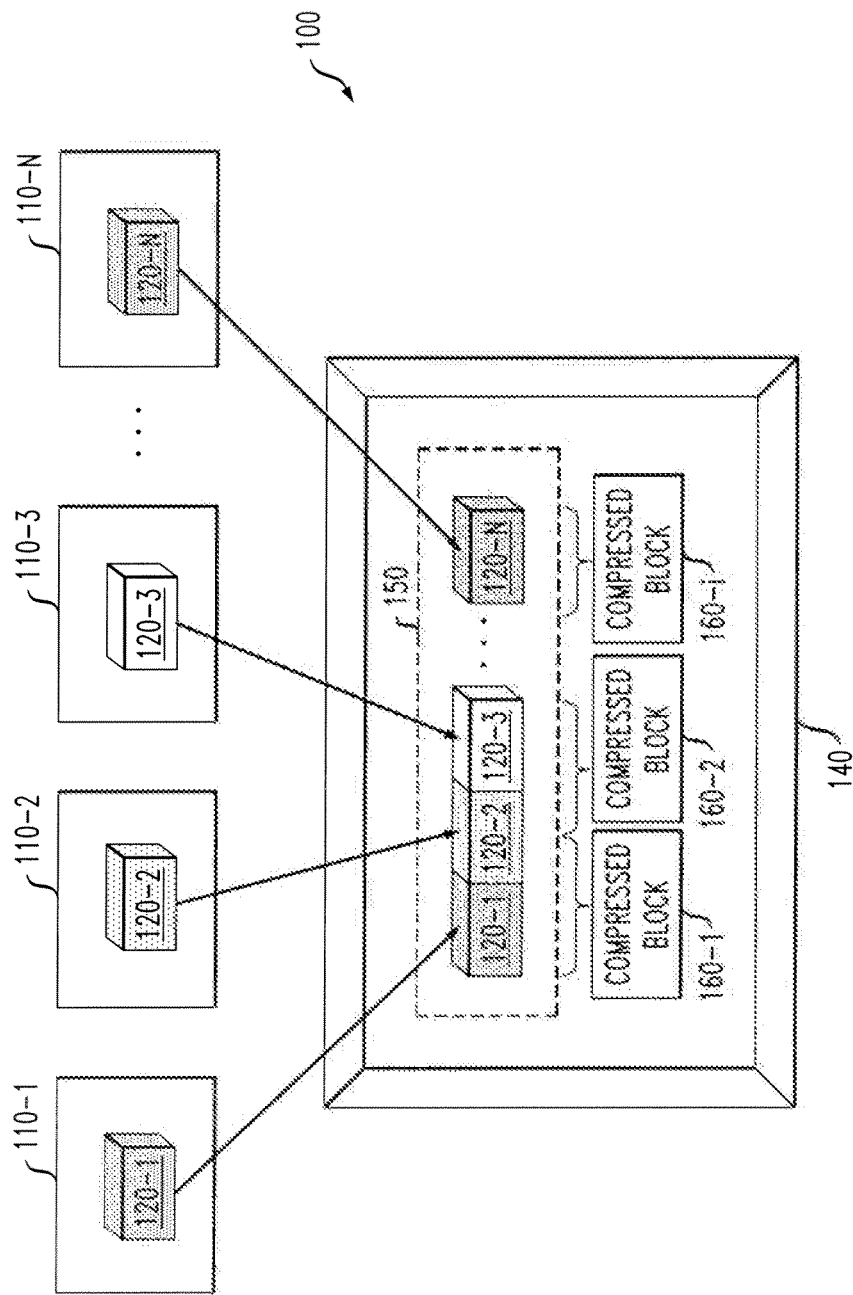
FIG. 1 illustrates an exemplary conventional technique for compressing data being stored to a shared object by a plurality of processes in a storage system.

FIG. 1 illustrates an exemplary conventional storage system 100 that employs a conventional technique for compression of data being stored to a shared object 150 by a plurality of processes. The exemplary storage system 100 may be implemented, for example, as a Parallel Log-Structured File System (PLFS) to make placement decisions automatically, as described in U.S. patent application Ser. No. 13/536,331, filed Jun. 28, 2012, entitled "Storing Files in a Parallel Computing System Using List-Based Index to Identify Replica Files," (now U.S. Pat. No. 9,087,075) incorporated by reference herein, or it can be explicitly controlled by the application and administered by a storage daemon.

As shown in FIG. 1, the exemplary storage system 100 comprises a plurality of compute nodes 110-1 through 110-N (collectively, compute nodes 110) where a distributed application process generates a corresponding portion 120-1 through 120-N of a distributed shared data structure 150 or other information to store. The compute nodes 110 optionally store the portions 120 of the distributed data structure 150 in one or more nodes of the exemplary storage system 100, such as an exemplary flash based storage node 140. In addition, the exemplary hierarchical storage tiering system 100 optionally comprises one or more hard disk drives (not shown).

As shown in FIG. 1, the compute nodes 110 send their distributed data chunks 120 into a single file 150. The single file 150 is striped into file system defined blocks, and then each block is compressed into a compressed block 160-1 through 160-i. As indicated above, existing compression approaches compress the shared data structure 150 only after it has been sent to the storage node 140 of the storage system 100. Thus, as shown in FIG. 1, the compression is applied to offset ranges on the data in sizes that are pre-defined by the file system 100. The offset size of the compression does not typically align with the size of the data portions 120 (i.e., the file system defined blocks will typically not match the original memory layout).

Figure 2:
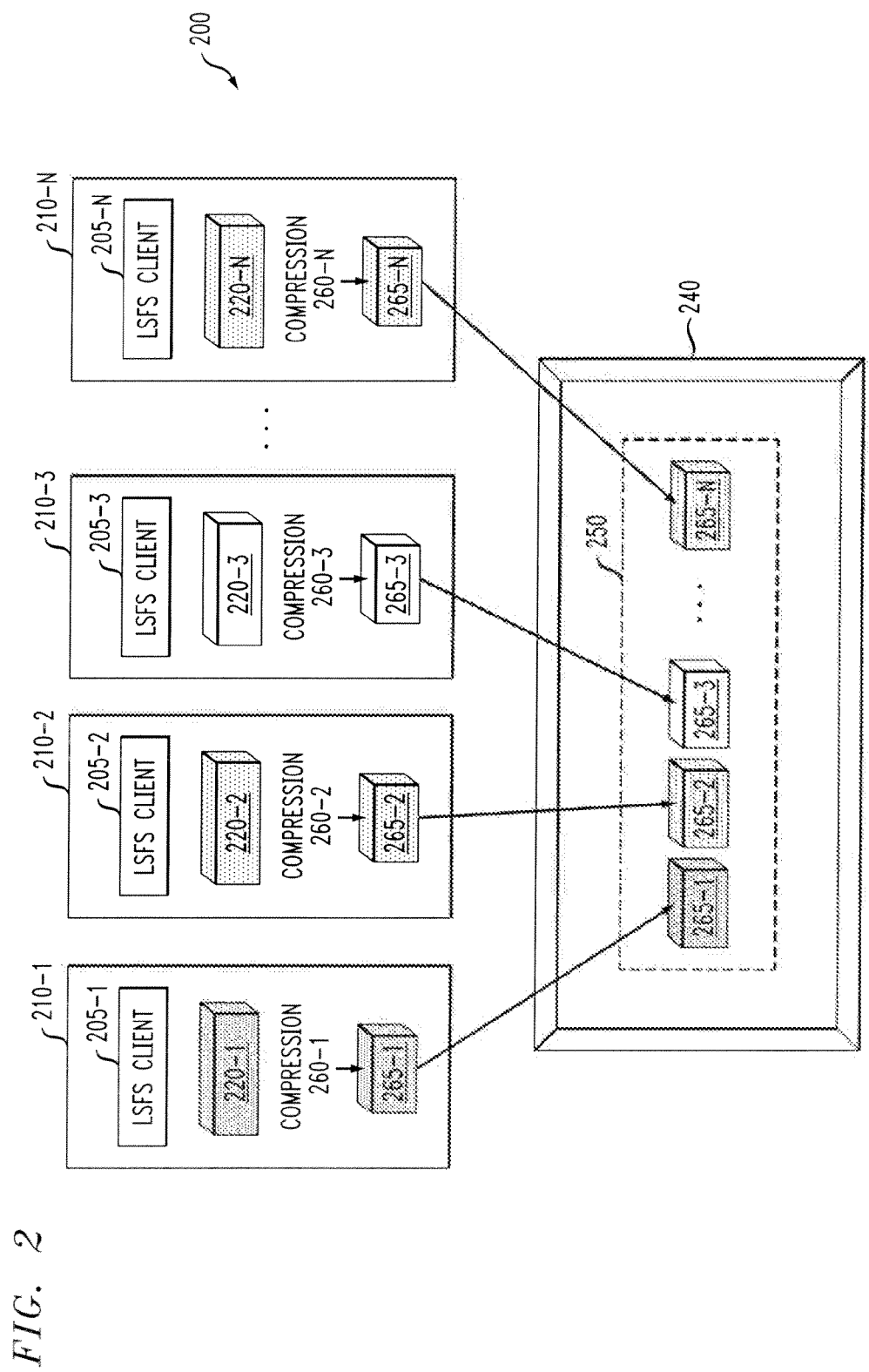
FIG. 2 illustrates an exemplary distributed technique for compression of data being stored to a shared object by a plurality of processes in a storage system in accordance with aspects of the present invention.

FIG. 2 illustrates an exemplary storage system 200 that compresses data chunks 220 being stored to a shared object 250 by a plurality of processes in accordance with aspects of the present invention. The exemplary storage system 200 may be implemented, for example, as a Parallel Log-Structured File System.

As shown in FIG. 2, the exemplary storage system 200 comprises a plurality of compute nodes 210-1 through 210-N (collectively, compute nodes 210) where a distributed application process generates a corresponding data chunk portion 220-1 through 220-N (collectively, data chunks 220) of a distributed shared data object 250 to store. The distributed application executing on given compute node 210 in the parallel computing system 200 writes and reads the data chunks 220 that are part of the shared data object 250 using a log-structured file system (LSFS) client 205-1 through 205-N executing on the given compute node 210.

In accordance with one aspect of the present invention, on a write operation, each LSFS client 205 applies a corresponding compression 260-1 through 260-N to each data chunk 220-1 through 220-N to generate a corresponding compressed data chunk 265-1 through 265-N. Each compressed data chunk 265 is then stored by the corresponding LSFS client 205 on the compute nodes 210 on one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

In accordance with another aspect of the present invention, on a read operation, the LSFS client 205 performs a de-compression on the read operation, where the requested compressed data chunks 265 are read from the LSFS server 240 and are provided to the corresponding LSFS client 205 on the compute node 210 for de-compression before being sent to the application.

Figure 3:
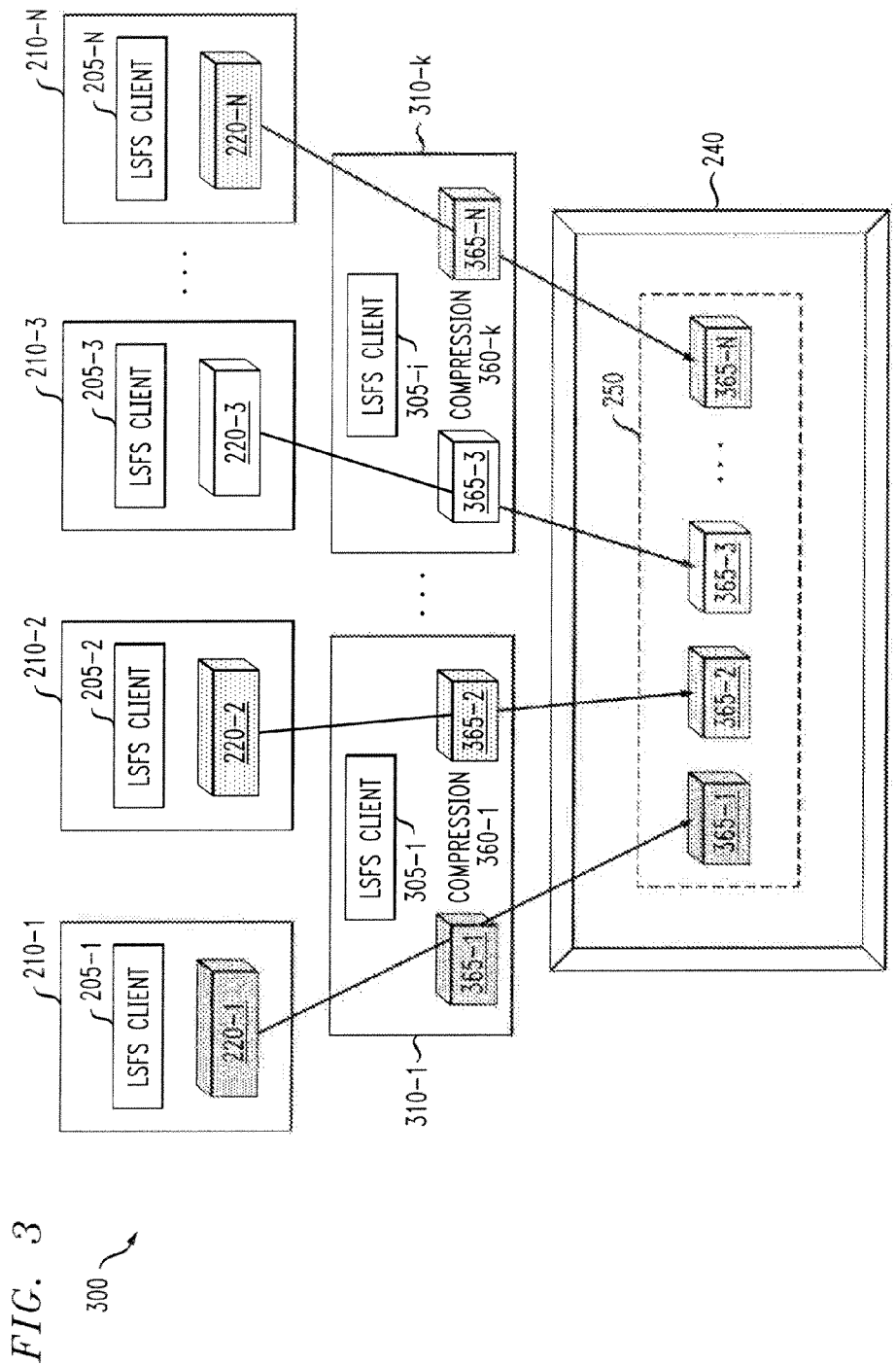
FIG. 3 illustrates an exemplary alternate distributed technique for compression of data being stored to a shared object by a plurality of processes in a storage system in accordance with an alternate embodiment of the present invention.

FIG. 3 illustrates an exemplary storage system 300 that compresses data chunks 220 being stored to a shared object 250 by a plurality of processes in accordance with an alternate embodiment of the present invention. The exemplary storage system 300 may be implemented, for example, as a Parallel Log-Structured File System. As shown in FIG. 3, the exemplary storage system 300 comprises a plurality of compute nodes 210-1 through 210-N (collectively, compute nodes 210) where a distributed application process generates a corresponding data chunk portion 220-1 through 220-N (collectively, data chunks 220) of a distributed shared data object 250 to store, in a similar manner to FIG. 2. The distributed application executing on given compute node 210 in the parallel computing system 200 writes and reads the data chunks 220 that are part of the shared data object 250 using a log-structured file system (LSFS) client 205-1 through 205-N executing on the given compute node 210, in a similar manner to FIG. 2.

As discussed hereinafter, a compressed version of the distributed data structure 250 is stored in one or more storage nodes of the exemplary storage system 200, such as an exemplary LSFS server 240. The LSFS server 240 may be implemented, for example, as a flash based storage node. In addition, the exemplary hierarchical storage tiering system 200 optionally comprises one or more hard disk drives (not shown).

The exemplary storage system 300 also comprises one or more flash-based burst buffer nodes 310-1 through 310-$k$ that process the data chunks 220 that are written by the LSFS clients 205 to the LSFS server 240, and are read by the LSFS clients 205 from the LSFS server 240. The exemplary flash-based burst buffer nodes 310 comprise LSFS clients 305 in a similar manner to the LSFS clients 205 of FIG. 2.

In accordance with one aspect of the present invention, on a write operation, each burst buffer node 310 applies a compression function 360-1 through 360-$k$ to each data chunk 220-1 through 220-N to generate a corresponding compressed data chunk 365-1 through 365-N. Each compressed data chunk 365 is then stored on the LSFS server 240, in a similar manner to FIG. 2.

In accordance with another aspect of the present invention, on a read operation, the LSFS client 305 on the burst buffer node 310 performs a de-compression on the read operation, where the requested compressed data chunks 365 are read from the LSFS server 240 and are provided to the burst buffer node 310 for de-compression before the de-compressed data chunks 220 are sent to the application executing on the compute node 210.

On a burst buffer node 310, due to the bursty nature of the workloads, there is additional time to run computationally intensive compression and de-compression.

It is noted that the embodiments of FIGS. 2 and 3 can be combined such that a first level compression is performed by the LSFS clients 205 executing on the compute nodes 210 and additional more computationally intensive compression is performed by the burst buffer nodes 310.

While such distributed compression may reduce performance due to latency, this is outweighed by the improved storage and transmission efficiency. Additionally, on the burst buffer nodes 310, this additional latency will not be incurred by the application since the latency will be added not between the application on the compute nodes 210 and the burst buffer nodes 310 but between the asynchronous transfer from the burst buffer nodes 310 to the lower storage servers 240.

It is anticipated, however, that performance will be improved in most settings (e.g., the total time to move data between the compute server 210 and the storage server 240 is typically much faster when data is compressed). The time spent on the compression or decompression is typically much less than the time gained from doing a network transmission of a smaller amount of data. The variables may be expressed as follows:

$$Time\_uncompressed = Data\_uncompressed/Bandwidth$$

$$Time\_compressed = Compress\_time + Data\_compressed/Bandwidth$$

For example, if Bandwidth is 1 GB/s and the data is 1 GB, and can be compressed to 0.5 GB in 0.25 seconds, then the time to move the data between the compute server 210 and the data server 240 without compression is:

$$Time\_uncompressed = 1\ GB/1\ GB/s = 1\ second$$

$$Time\_compressed = 0.5\ GB/1\ GB/s + 0.25\ second = 0.75\ seconds$$

Thus, in this exemplary environment, a performance boost of 25% is achieved. Recent research into compression rates for HPC workloads, e.g., Dewan Ibtesham et al., "On the Viability of Compression for Reducing the Overheads of Checkpoint/Restart-based Fault Tolerance," 41st Int'l Conf. on Parallel Processing (ICPP), 148-57 (2012), has shown that compression for typical HPC workloads results in large performance gains and they were actually assuming that you'd do compression at both compute server and storage server. Embodiments of the present invention only perform the compression at the compute nodes 210 and aspects of the present invention makes it so that larger chunks of data can be compressed, thereby further improving the compression ratio. Thus, aspects of the present invention provide a larger gain than what was realized by the above-referenced recent research.

Figure 4:
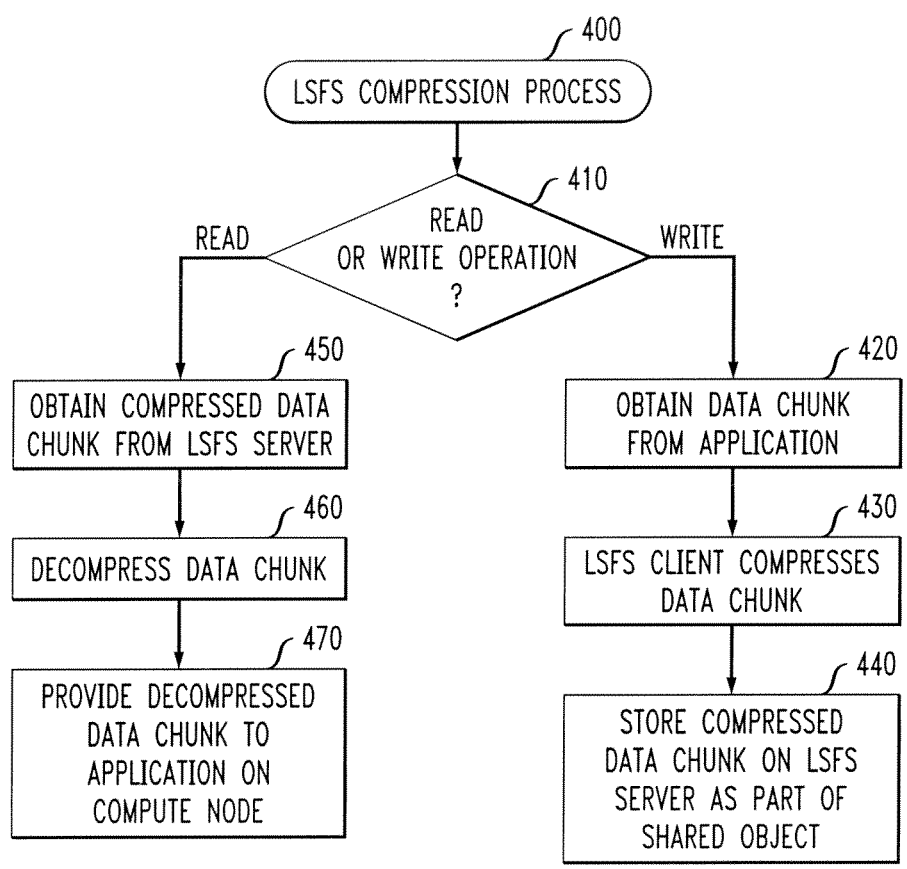
FIG. 4 is a flow chart describing an exemplary LSFS compression process incorporating aspects of the present invention.

FIG. 4 is a flow chart describing an exemplary LSFS compression process 400 incorporating aspects of the present invention. The exemplary LSFS compression process 400 is implemented by the LSFS clients 205 executing on the compute nodes 210 in the embodiment of FIG. 2 and by the flash-based burst buffer nodes 310 in the embodiment of FIG. 3.

As shown in FIG. 4, the exemplary LSFS compression process 400 initially performs a test during step 410 to determine if the current operation is a read operation or a write operation. If it is determined during step 410 that the current operation is a read operation, then the exemplary LSFS compression process 400 obtains the data chunk from the application during step 420. The exemplary LSFS compression process 400 then compresses the data chunk during step 430 on the compute nodes 210 or the burst buffer nodes 310. Finally, the compressed data chunk is stored on the LSFS server 240 as part of the shared object 250 during step 440.

If, however, it is determined during step 410 that the current operation is a write operation, then the exemplary LSFS compression process 400 obtains the compressed data chunk from the LSFS server 240 during step 450. The compressed data chunk is then decomressed during step 460 and the decompressed data chunk is provided to the application on the compute node during step 470.

Among other benefits, the number of compute servers 210 is at least an order of magnitude greater than the number of storage servers 240 in HPC systems, thus it is much faster to perform the compression on the compute servers 210. In addition, the compression is perfomed on the data chunks 220 as they are being written by the LSFS client 205 as opposed to when they have been placed into the file 250 by the server 240. The chunks 220 in a log-structured file system retain their original data organization whereas in existing approaches, the data in the chunks will almost always be reorganized into file system defined blocks. This can introduce additional latency as the file system will either wait for the blocks to be filled or do the compression multiple times each time the block is partially filled.

In this manner, aspects of the present invention leverage the parallelism of concurrent writes to a shared object and the high interconnect speed of parallel supercomputer networks to improve data compression during a write operation and to improve data de-compression during a read operation. Aspects of the present invention thus recognize that the log-structured file system elimintes the need for artificial file system boundaries because all block sizes perform equally well in a log-structured file system.

Because PLFS files can be shared across many locations, data processing required to implement these functions can be performed more efficiently when there are multiple nodes cooperating on the data processing operations. Therefore, when this is run on a parallel system with a parallel language, such as MPI, PLFS can provide MPI versions of these functions which will allow it to exploit parallelism for more efficient data processing.

Consider a partial read. For example, assume that a write operation wrote bytes {0-100} and the corresponding compressed data chunk was stored at write time. If the reader reads bytes {25-75}, then the compressed data chunk does not match those bytes 25-75. So the storage server node 240 can send the entire byte range to the compute node or burst buffer for de-compression or de-compress bytes 25-75 and only send those. The former approach has the disadvantage of sending unnecessary data across the network. The latter approach has the disadvantage of doing the de-compression on the storage server node 240 instead of the much more scalable compute nodes 210 or burst buffer nodes 310.

CONCLUSION

Numerous other arrangements of servers, computers, storage devices or other components are possible. Such components can communicate with other elements over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a log-structured file system client executing on one or more of a compute node and a burst buffer node in a parallel computing system for storing a data chunk generated by said parallel computing system to a shared data object on a storage node in said parallel computing system, comprising:

processing said data chunk generated by said parallel computing system using said log structured file system client executing on at least one processing device, wherein said log structured file system client executes on one or more of said compute node and said burst buffer node in said parallel computing system;

compressing, by said log-structured file system client executing on at least one processing device, said data chunk as said data chunk is written by said log-structured file system client to said storage node, wherein a plurality of other log structured file system clients compress a corresponding plurality of other data chunks of said shared data object in parallel to generate a plurality of compressed other data chunks; and providing, by said log-structured file system client executing on at least one processing device, said compressed data chunk to said storage node for storage as part of said shared object, wherein said storage node stores said compressed data chunk as part of said shared object with said plurality of compressed other data chunks, and wherein said shared object is shared by a plurality of distributed processes in said parallel computing system.

2. The method of claim 1, wherein said storage node comprises a Log-Structured File server.

3. The method of claim 2, wherein said Log-Structured File server stores said compressed version of said data chunk to said shared data object on said compute node.

4. The method of claim 1, further comprising the step of de-compressing said compressed data chunk when said data chunk is read from said storage node.

5. The method of claim 4, further comprising the step of providing said de-compressed data chunk to an application.

6. A non-transitory machine-readable recordable storage medium for storing a data chunk generated by a parallel computing system to a shared data object on a storage node in said parallel computing system, wherein one or more software programs when executed by one or more processing devices implement the steps of the method of claim 1.

7. A compute node apparatus in a parallel computing system for executing a log-structured file system client that stores a data chunk generated by said parallel computing system to a shared data object on a storage node in said parallel computing system, said compute node apparatus comprising:

a memory; and at least one hardware device operatively coupled to the memory and configured to:

process said data chunk generated by said parallel computing system using said log structured file system client executing on at least one processing device, wherein said log structured file system client executes on one or more of said compute node and said burst buffer node in said parallel computing system;

compress, by said log-structured file system client executing on at least one processing device, said data chunk as said data chunk is written by said log-structured file system client to said storage node, wherein a plurality of other log structured file system clients compress a corresponding plurality of other data chunks of said shared data object in parallel to generate a plurality of compressed other data chunks; and provide, by said log-structured file system client executing on at least one processing device, said compressed data chunk to said storage node for storage as part of said shared object, wherein said storage node stores said compressed data chunk as part of said shared object with said plurality of compressed other data chunks, and wherein said shared object is shared by a plurality of distributed processes in said parallel computing system.

8. The compute node apparatus of claim 7, wherein said storage node comprises a Log-Structured File server.

9. The compute node apparatus of claim 8, wherein said Log-Structured File server stores said compressed version of said data chunk to said shared data object on said compute node.

10. The compute node apparatus of claim 7, wherein said at least one hardware device is further configured to de-compress said compressed data chunk when said data chunk is read from said storage node.

11. The compute node apparatus of claim 10, wherein said at least one hardware device is further configured to provide said de-compressed data chunk to an application.

12. The compute node apparatus of claim 7, wherein said apparatus comprises one or more of a compute node and a burst buffer node.

13. A method performed by a storage node comprising a Log-Structured File server in a parallel computing system for storing a data chunk as part of a shared object, comprising:

receiving, by said Log-Structured File server executing on at least one processing device, a compressed version of said data chunk compressed by a log-structured file system client executing on at least one processing device of a compute node in said parallel computing system;

receiving, by said Log-Structured File server executing on at least one processing device, a compressed version of a plurality of other data chunks of said shared data object compressed by a plurality of other log-structured file system clients executing on at least one processing device of a plurality of other compute nodes in said parallel computing system; and storing, by said Log-Structured File server executing on at least one processing device, said compressed version of said data chunk to said shared data object on said storage node with said plurality of compressed versions of said other data chunks of said shared data object from said plurality of other log-structured file system clients, and wherein said shared object is shared by a plurality of distributed processes in said parallel computing system.

14. The method of claim 13, further comprising the step of providing said compressed data chunk to a compute node when said data chunk is read from said storage node.

15. A non-transitory machine-readable recordable storage medium for storing a data chunk as a shared object in a parallel computing system, wherein one or more software programs when executed by one or more processing devices implement the steps of the method of claim 13.

16. The method of claim 13, wherein said compressed version is generated by a Log-Structured File System client.

17. The method of claim 13, further comprising the steps of decompressing said compressed version and providing the decompressed data chunk to the compute node.

18. A storage node apparatus comprising a Log-Structured File server in a parallel computing system for storing a data chunk as part of a shared object, said storage node apparatus comprising:
 a memory; and
 at least one hardware device operatively coupled to the memory and configured to:
  receive, by said Log-Structured File server executing on at least one processing device, a compressed version of said data chunk compressed by a log-structured file system client executing on at least one processing device of a compute node in said parallel computing system;
  receive, by said Log-Structured File server executing on at least one processing device, a compressed version of a plurality of other data chunks of said shared data object compressed by a plurality of other log-structured file system clients executing on at least one processing device of a plurality of other compute nodes in said parallel computing systems; and
  store, by said Log-Structured File server executing on at least one processing device, said compressed version of said data chunk to said shared data object on said storage node with said plurality of compressed versions of said other data chunks of said shared data object from said plurality of other log-structured file system clients, and wherein said shared object is shared by a plurality of distributed processes in said parallel computing system.

19. The storage node apparatus of claim 18, wherein said at least one hardware device is further configured to provide said compressed data chunk to a compute node when said data chunk is read from said storage node.

20. The storage node apparatus of claim 18, wherein said compressed version is generated by a Log-Structured File System client.

\* \* \* \* \*

UNITED STATES PATENT AND TRADEMARK OFFICE
CERTIFICATE OF CORRECTION

PATENT NO. : 9,477,682 B1   Page 1 of 1
APPLICATION NO. : 13/799228
DATED : October 25, 2016
INVENTOR(S) : Bent et al.

It is certified that error appears in the above-identified patent and that said Letters Patent is hereby corrected as shown below:

In the Specification

In Column 6, Line 8, replace "data chunk is then decomressed" with --data chunk is then decompressed--.

In Column 6, Line 19, replace "data organization whereas in" with --data organization, whereas in--.

In Column 6, Line 31, replace "file system elimnates" with --file system eliminates--.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*